US008544889B2

(12) United States Patent
Vincenzotti

(10) Patent No.: US 8,544,889 B2
(45) Date of Patent: Oct. 1, 2013

(54) MOTORIZED FASTENING DEVICE FOR SEAT BELTS OF A TRANSPORTATION VEHICLE

(71) Applicant: Maurizio Vincenzotti, Rome (IT)

(72) Inventor: Maurizio Vincenzotti, Rome (IT)

( * ) Notice: Subject to any disclaimer, the term of this patent is extended or adjusted under 35 U.S.C. 154(b) by 0 days.

(21) Appl. No.: 13/750,307

(22) Filed: Jan. 25, 2013

(65) Prior Publication Data
US 2013/0200605 A1 Aug. 8, 2013

Related U.S. Application Data

(63) Continuation of application No. PCT/IT2011/000249, filed on Jul. 15, 2011.

(30) Foreign Application Priority Data

Jul. 27, 2010 (IT) .............................. RM2010A0415

(51) Int. Cl.
*B60R 22/06* (2006.01)
(52) U.S. Cl.
USPC ............ 280/804; 280/808; 297/469; 297/481
(58) Field of Classification Search
USPC ................. 280/803, 804, 808; 297/469, 481, 297/482, 483
See application file for complete search history.

(56) References Cited

U.S. PATENT DOCUMENTS 3,833,239 A * 9/1974 Coenen .......................... 280/804
4,070,040 A * 1/1978 Igeta .............................. 297/469
4,082,317 A * 4/1978 Weman .......................... 280/802
4,275,903 A * 6/1981 Matsuoka et al. ............. 280/803
4,286,804 A * 9/1981 Maekawa et al. ............. 280/803

(Continued)

FOREIGN PATENT DOCUMENTS

FR 2324323 4/1977
WO WO2007/080615 7/2007

OTHER PUBLICATIONS

International Search Report issued in PCT/IT2011/000249 Application, dated on Jul. 12, 2011.

*Primary Examiner* — Toan To
(74) *Attorney, Agent, or Firm* — Abe Hershkovitz; Hershkovitz & Associates PLLC

(57) ABSTRACT

A motorized fastening device for seat belts of a transportation vehicle, of the kind having a belt unwrapping from a coiler, which is fixedly arranged on a side of a seat, and passing in sequence through a regulator, which is fixedly arranged on the same side of said seat where also said coiler is arranged, a tongue, a housing of said tongue and a blocking point of the extremity of the belt, which is fixedly arranged in proximity of said coiler, wherein said device further has a track for the sliding of a transport carriage for said tongue, obtained on the chassis of said vehicle, defining a path going from a first position, corresponding to a position of non-use of the seat belts, positioned on the chassis of the vehicle, on the same side of the seat with respect to said coiler and said regulator, behind or at the base of the back of the seat and that, passing under the door and within or under the dashboard of the vehicle, arrives to a second position, corresponding to a working position of the seat belts, behind or at the base of the back of the seat, on the opposite side of the seat with respect to the position of said coiler and of said regulator.

20 Claims, 4 Drawing Sheets

(56) References Cited

U.S. PATENT DOCUMENTS

Figure 1:
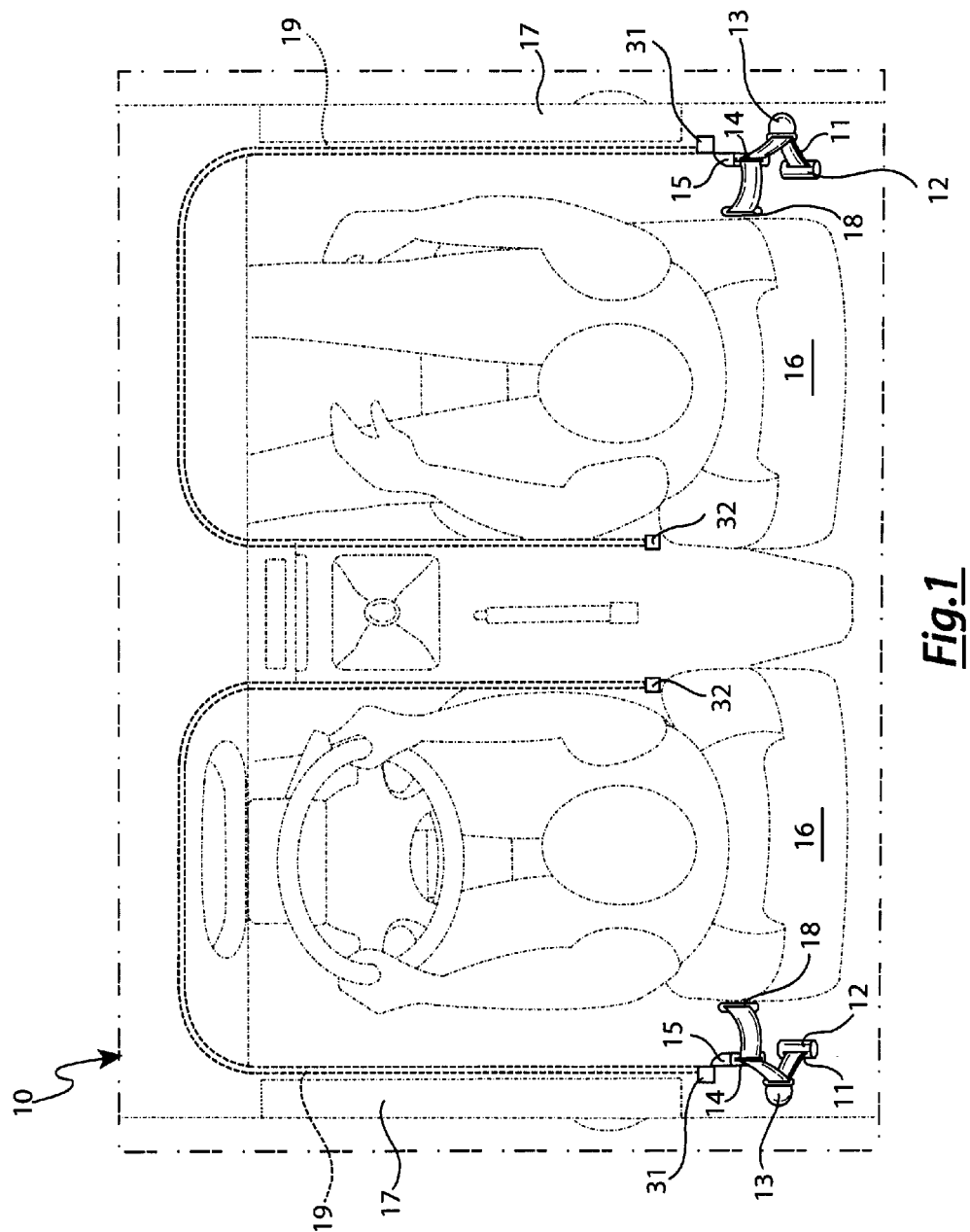

| | | | | |
|---|---|---|---|---|
| 4,313,622 A | * | 2/1982 | Suzuki et al. | 280/804 |
| 4,475,745 A | * | 10/1984 | Fohl | 280/804 |
| 5,183,291 A | | 2/1993 | Shah | |
| 5,692,781 A | | 12/1997 | Lee | |
| 5,709,408 A | * | 1/1998 | Carraway, Jr. | 280/804 |

\* cited by examiner

MOTORIZED FASTENING DEVICE FOR SEAT BELTS OF A TRANSPORTATION VEHICLE

The present application is a continuation of International PCT Application No. PCT/IT2011/000249, filed Jul. 15, 2011, which claims priority under 35 U.S.C. §119 to Italian Patent Application No. RM2010A000415, filed Jul. 27, 2010, the disclosures of which are incorporated by reference herein in their entireties.

The present invention concerns a motorized fastening device for seat belts of a transportation vehicle.

The invention refers to the field of road safety, particularly inside the driver and passenger compartments of cars, lorries, collective transport vehicles, but also, after appropriate simple adjustments, inside the driver and passenger compartment of other means of transport, such as two wheels vehicles provided with user protection structures.

According to the prior art, a safety belt is a belt one end of which is wrapped around a spring coiler, positioned low on a side of the seat of the user, and the other end of which is fixed to a blocking point positioned very close to the coiler. Along the path from the spring coiler to the blocking point, the belt passes through the passing slot of a regulator, located at a position that is different but substantially along the vertical line passing for the spring coiler, and the function of which is to constitute a point of passage of the belt at the height of the shoulder and the neck of the user and, in its portion that from said slot heads towards said blocking point, can be pulled, by means of a progressive and continue action, by means of a tongue with a slide slot that will be coupled with an appropriate closure seat of the tongue, in a blocking point positioned substantially at the same height but at the opposed side of the seat of the user with respect to the position of the coiler, so that the belt, in its path from said regulator to said blocking point for the tongue, fastens the chest of the user, and in its path from said blocking point of the tongue to said blocking point close to the coiler, fastens the waist of the user. The function of safety belts is that of preventing that, as a consequence of a sudden deceleration or stop, for example due to a collision, the body of the user can be abruptly push ahead, as an effect of the force of inertia, with the risk that it could hit the windscreen, the dashboard or the steering wheel of the car. In fact, the coiler jams as a consequence of an abrupt pull action, due for example to a jerk, such that consequent to the dragging due to the pushing ahead of the body of the user as a consequence of a strong deceleration for one of the aforesaid or similar causes.

At present, safety belts commonly on trade must be fastened by the user in order to exert their function. Particularly, when in its position of non-use, the belt is positioned completely on the same side of the seat, that facing towards the chassis of the car. Once he is seated, the user has to take the fastening tongue and insert it in its seat, thus keeping the belt that, gradually unwrapping from the spring coiler, arranges itself in its working position. In order to stand up from the seat and get out of the car, the user must press a quick drop button of the fastening tongue and wait for the belt to wrap again returning to its resting position.

A limit of the safety belts of the prior art which cannot be solved is intrinsically linked to the voluntarily of their use. In fact, whether inadvertently or because they do not like them, or also because of physical problems, such as handicaps or obesity or low mobility due to age, sometimes the driver and/or the passengers of a car do not fasten their seat belts, the presence of which becomes useless for safety. In order to limit non-use of safety belts, on board of the most recently produced cars a device is added that, preferably intermittently, lights on a warning light, which can be associated with the sound of acoustic effects, lasting until the tongue of the belt is not inserted in the appropriate seat.

As a matter of fact, due to their structure, safety belts of the traditional kind cannot get out of the necessity of a direct action of the user. In fact, if seat belts were somehow blocked in their working position, the user would be asked to fasten seat belts in a very uncomfortable way and therefore he would be more subjected to the difficulties and bothered by their use.

In order to solve this problem, it was proposed, according to the Italian patent application No. RM2006A000012 in the name of the same inventor, also published as WO-A-2007/080615, a seat belt system which is able to get to its position of use without needing any intervention of the user and without modifying the normal operations of getting into the vehicle and taking place on the seat.

In particular, the cited patent application discloses and claims an automatic fastening device for seat belts of a transport vehicle in which, the tongue being constantly inserted in the corresponding seat, the coiler and the regulator are provided with a driving system, comprising at least one track for sliding realized in the chassis and/or in the door of said vehicle, to move said coiler and said regulator from a first position of non-use, wherein the belt is kept at a distance from the seat that is sufficient for allowing the getting in and sit of a passenger/driver within said vehicle, and a second position of use, wherein the belt encircles the torso and the waist of said passenger/driver, and wherein the final blocking of the belt is integral with the coiler.

According to a preferred embodiment, the automatic fastening device for seat belts according to the patent application N. RM2006A000012 comprises two tracks for sliding, a lower track for the sliding of the coiler and an upper track for the sliding of the regulator.

In particular, in the position of non use the coiler and the regulator are in an advanced position with respect to the seat and/or on the same side of the seat with respect to the housing of the tongue.

The problem of this kind of solution is the fact that it is necessary to provide for the moving of both the coiler (and together with it of the end blocking of the belt) and the regulator, with the consequence that the power needed for operating the device implies high energy requests. Moreover, the damaging of only one of the two mechanisms would compromise the operation of the whole system.

In the light of the above, it is evident the need for a motorised fastening device for seat belts of a transportation vehicle which is able to arrive to a position of use without requiring for the intervention of the user and without modifying the normal operations of getting in the vehicle and taking place on the seat, according to which it is sufficient to provide for the moving of only one of the three points of passage of the belt.

These and other results are achieved according to the present invention by proposing a motorised fastening device for seat belts of a transportation vehicle wherein the tongue is secured to a carriage that can move, along a track for sliding realised in the chassis of said vehicle or partially in the chassis and partially in the door of said vehicle, from a first position, corresponding to a position of non use of the belts, on the same side of the corresponding coiler and regulator, in a position behind the door, to a second position, corresponding to a position of use of the belts, on the opposite side of the seat with respect to the corresponding coiler and regulator, wherein the belt takes a position suitable for girding the torso and the waist of a passenger/driver.

An aim of the present invention is therefore that of realizing a motorized fastening device for seat belts of a transportation vehicle that allows for overcoming the limits of the solutions of the prior art and achieving the previously described technical results.

A further aim of the invention is that said device can be produced with substantially low costs, with reference to both the production costs and the operation costs.

Not last aim of the invention is that of realizing a motorized fastening device for seat belts of a transportation vehicle which is substantially simple, safe and reliable.

It is therefore a specific object of the present invention a motorized fastening device for seat belts of a transportation vehicle, of the kind comprising a belt unwrapping from a coiler, which is fixedly arranged on a side of a seat, and passing in sequence through a regulator, which is fixedly arranged on the same side of said seat where also said coiler is arranged, a tongue, a housing of said tongue and a blocking point of the extremity of the belt, which is fixedly arranged in proximity of said coiler, wherein said device further comprises a track for the sliding of a transport carriage for said tongue, obtained on the chassis of said vehicle, defining a path going from a first position, corresponding to a position of non use of the seat belts, positioned on the chassis of the vehicle, on the same side of the seat with respect to said coiler and said regulator, behind or at the base of the back of the seat and that, passing under the door and within or under the dashboard of the vehicle, arrives to a second position, corresponding to a working position of the seat belts, behind or at the base of the back of the seat, on the opposite side of the seat with respect to the position of said coiler and of said regulator.

Alternatively, according to the present invention, said tongue can be fixedly inserted in the corresponding housing, transported by said carriage along its path from said first position to said second position of said track and vice versa, or said housing of said tongue is fixed in a position at the base of the back of the seat, on the opposite side of the seat with respect to the position of said coiler and of said regulator, and said carriage transports only said tongue in its movement from said first position to said second position of said track and vice versa.

Preferably, according to the invention, the displacement of said carriage is operated by electric and/or electro-mechanic moving means and is operated by specific manual controls and/or controls connected with the starter of the engine.

More preferably, according to the invention, said carriage is linked to at least one transport wire, belt or chain, following said path and moved by a transport mechanism operated by at least one electric and/or electro-mechanic engine.

Still more preferably, according to the present invention, said transport mechanism comprises a power pulley and a driven pulley, respectively arranged in a position behind said first position and to said second position of said track or vice versa, said power pulley being operated by said electric and/or electro-mechanic engine, said wire forming a closed circuit passing through both said pulleys.

Alternatively, always according to the invention, said transport mechanism comprises two reels, respectively arranged in a position behind said first position and to said second position of said track, said reels being each operated by an electric and/or electro-mechanic engine, said at least one wire winding alternatively around one of the two reels and unwinding from the other.

Preferably, still according to the present invention, said transport mechanism comprises two wires, one end of each wire being integral with said carriage, the opposed end of each wire being integral with respectively one of the two reels.

According to a further alternative, always according to the invention, said transport mechanism comprises a reel operated by an electric and/or electro-mechanic engine and a driven pulley, respectively collocated in a position behind said first position and to said second position of said track or vice versa, one of the ends of said at least one wire winding around said reel, said at least one wire passing through said driven pulley.

Figure 2:
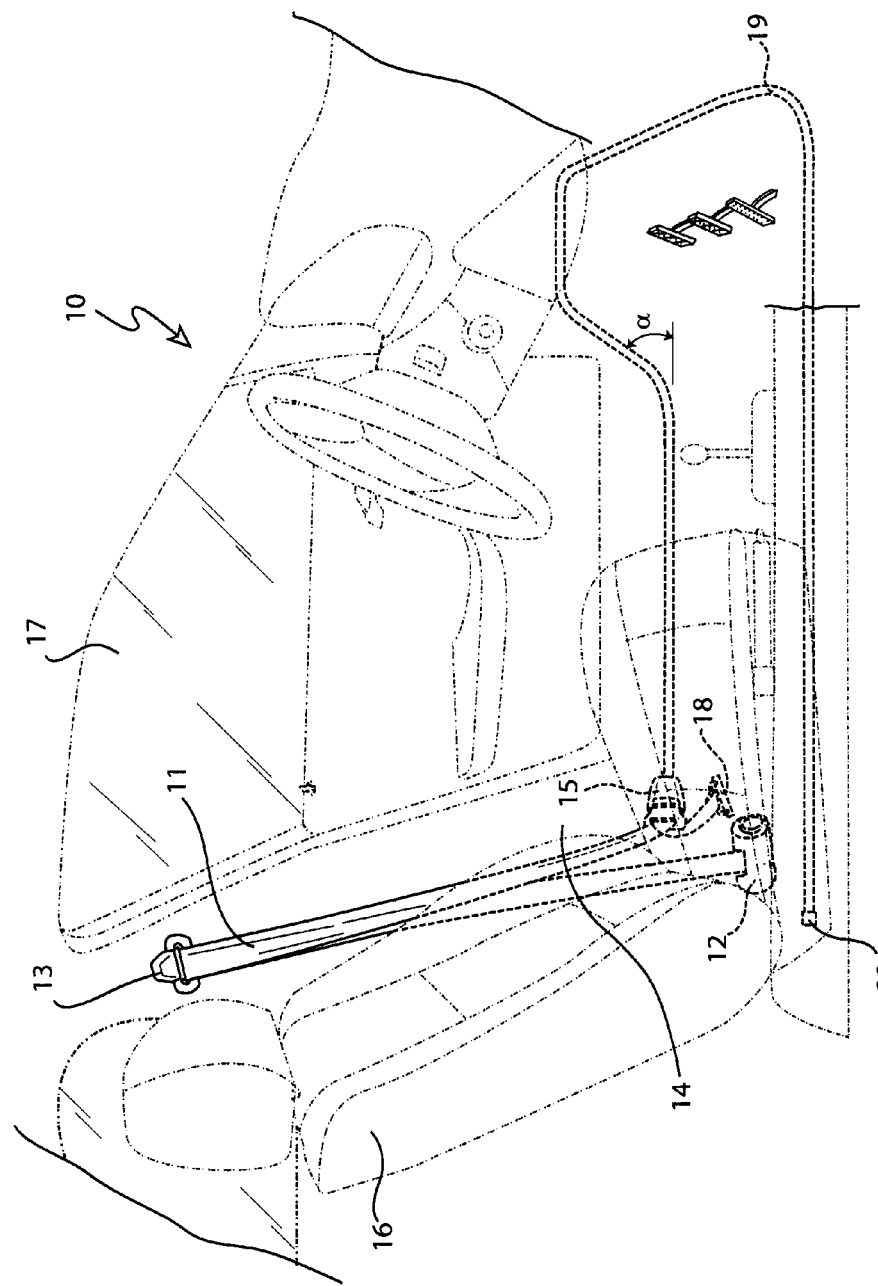
Figure 3:
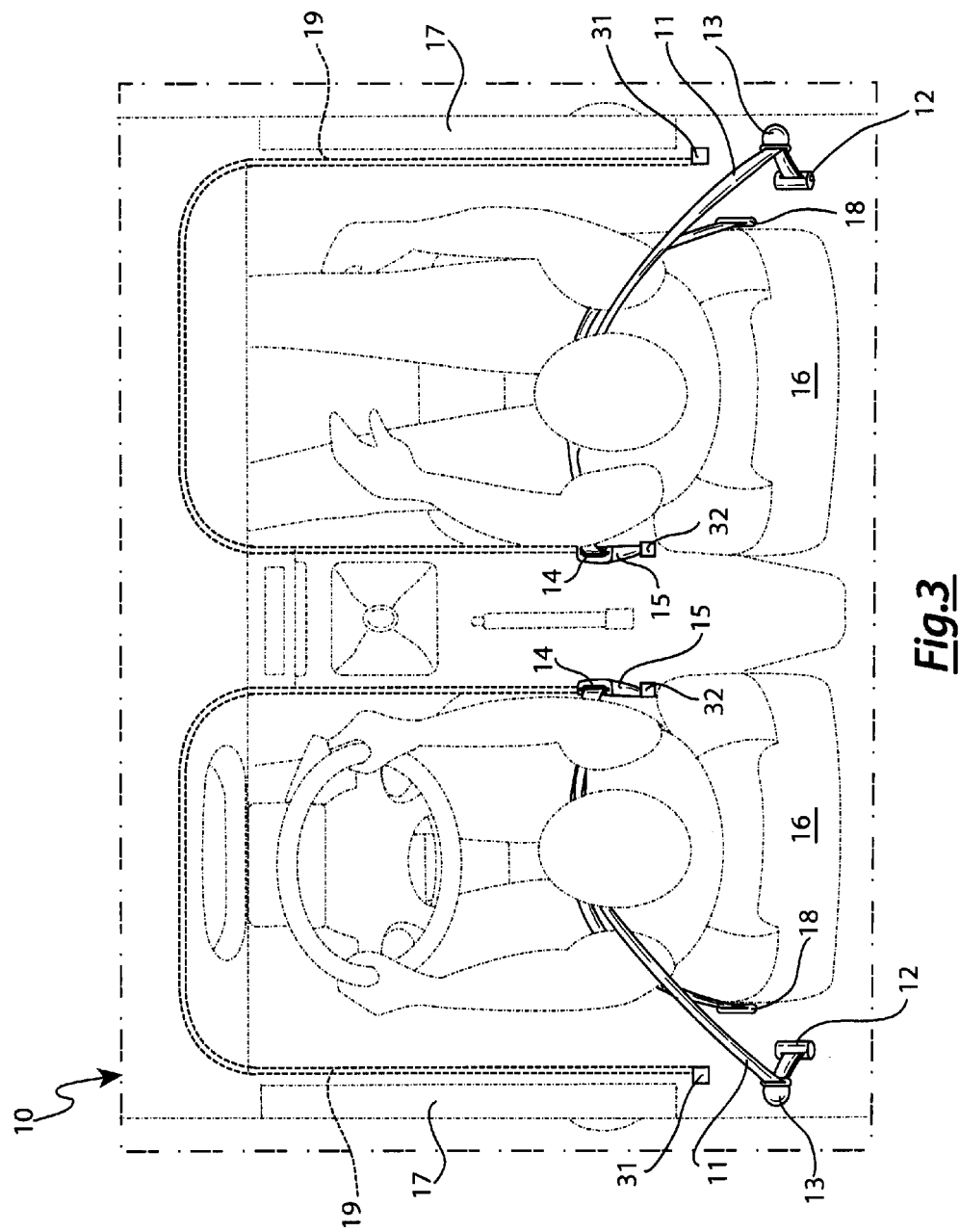
Figure 4:
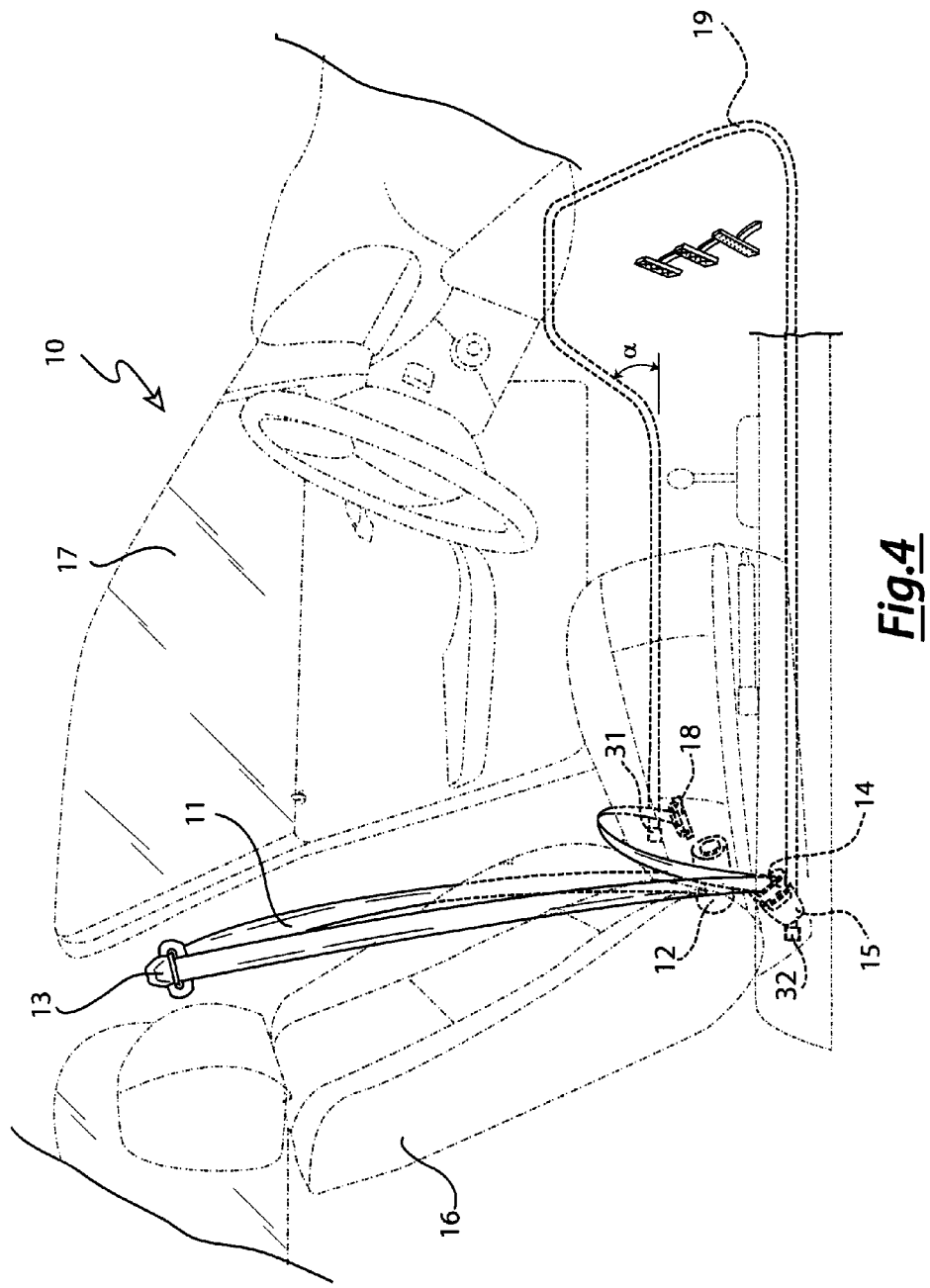

The present invention will be disclosed, for illustrative non limitative purposes, according to its preferred embodiments, with reference in particular to the figures of the enclosed drawings, wherein:

FIG. 1 shows a top plan view of a motorized fastening device for seat belts according to the present invention, in position of non use, FIG. 2 shows a perspective view of the motorized fastening device for seat belts of FIG. 1, in position of non use, FIG. 3 shows a top plan view of the motorized fastening device for seat belts of a transportation vehicle of FIG. 1, in position of use, and FIG. 4 shows a perspective view of the motorized fastening device for seat belts of a transportation vehicle of FIG. 1, in position of use.

Making preliminarily reference to FIGS. 1 and 2, it is shown the front part of the inside of the cabin of a car, indicated as a whole with the reference number 10, wherein it is present the motorized fastening device for seat belts according to the present invention. In particular, in the embodiment shown, the device of the invention is comprised of a belt 11, similar to the known belts, unwrapping from a coiler 12, passing through the regulator 13, then passes through the tongue 14, inserted in the suitable housing 15 of the tongue, positioned on the chassis of the vehicle 10, on the same side of the seat 16 with respect to the coiler 12 and the regulator 13, in a position behind the door 17. From the tongue 14, the end part of the belt 11 arrives to a blocking ring 18, positioned on the chassis of the vehicle, close to the coiler 12.

In FIGS. 1 and 2, the motorized fastening device for seat belts according to the present invention is shown in the position of non use of the belts. From a comparison with the solutions of the prior art, some substantial differences are evident, in particular the position of the tongue 14 and of the corresponding housing 15, within which the tongue, in the embodiment shown of the invention, is inserted, positioned in correspondence of the chassis of the vehicle, in a position close to that of the coiler 12, whereas in the known devices the housing of the tongue is located in a fixed position on the chassis of the car, on the opposite side of the seat and the tongue, in the position of non use, is not inserted into its housing. The tongue 14 being constantly inserted into the corresponding housing 15 is evidently due to the need of allowing the users not to wear the seat belts by manually taking the tongue into its housing, whereas their position in condition of non use is due to the need of easing the getting of passengers in the car.

In fact, in the position of non use, the belt 11 discloses a path exactly identical to that described in traditional seat belts, allowing the user for comfortably take place on the seat 16, without incurring into the obstacle of the belt 11 and therefore with no need of take it apart in order to take position on the seat 16.

FIGS. 1 and 2 show a track 19 the path of which starts from a first position 31, at the base of the back of the seat on the side of the door, where the tongue 14 and the corresponding housing 15 are in position of non use, runs along the chassis passing first under the door 17, then in or under the dashboard and goes on till it ends in a second position 32, at the base of the back of the seat 16, on the side opposed to that of the door 17. In the embodiment shown, the track 19 is realized in a housing within the structure of the chassis, a slit being realised on the surface of the chassis allowing for the linkage between a carriage (not shown), moving along the track by means of a motion system that can be realized according to any of a plurality of technical solutions, and the tongue 14 and the corresponding housing 15 which are linked to the carriage which carries them while moving. Obviously, the housing of the track 19 can also be more simply mounted on the chassis, rather than inside it.

In any case, since the track passes under the door and, in the part passing under the dashboard, must pass above the pedals, a consequence is the need to follow a non straight path, provided with at least one curve a rather angled. A motion system particularly suitable for this kind of path provides for the carriage being transported by a cable or by an equally flexible element, which is not negatively affected by the presence of curves.

For example, the carriage can be coupled to a wire, a belt or a chain, forming a closed circuit, remaining inside the housing of the track 19, passing through two pulleys, a power pulley and a driven pulley, respectively located in a position behind the first position 31 and the second position 32 of said track, and moreover through a plurality of pulleys. The power pulley can be operated by an electric motor.

Alternatively, instead of forming a closed circuit, said wire can be coupled at its opposed ends respectively with two reels, respectively located in a position behind the first position 31 and the second position 32 of said track 19, said reels being each operated by an electric motor, the wire alternatively winding around one of the two reels and unwinding from the other. Moreover, the transport mechanism can comprise two wires, one of the ends of each wire being coupled with the carriage, the opposed end of each wire being respectively coupled with one of the two reels.

Moreover, said transport mechanism comprises a reel operated by an electric and/or electro-mechanic engine and a driven pulley, respectively collocated in a position behind said first position and said second position of said track or vice versa, one of the ends of said at least one wire winding around said reel, said at least one wire running along said path and passing through said driven pulley.

The function of the track 19 will be evident through a comparison of FIGS. 1 and 2 and FIGS. 3 and 4.

In fact, FIGS. 3 and 4 show the motorized fastening device for seat belts according to the present invention in its position of use when the vehicle is on route. After the user took place on the seat 16, the motorized fastening device for seat belts being in the position of non use shown in FIGS. 1 and 2, in consequence of the starting of the motor of the vehicle or of a voluntary command of the user, a carriage (not shown), initially in the first position 31 at the end of the track 19 positioned on the chassis of the vehicle 10 in a position behind the door 17, starts moving along the track 19, carrying the housing 15 and the tongue 14, until it reaches the second position 32, at the opposed end of the track 19, at the base of the back of the seat 16, on the side opposed to that of the door 17, wherein a tongue positioned on the carriage is blocked in a solenoid brake, assuring the blocking of the carriage and consequently of the housing 15, till when an electric pulse operates the solenoid brake so that it takes the pin back and frees the carriage. During this run of the tongue 14, the belt 11 will wind and unwind around the coiler 12 depending on the distance between the tongue 14 and the coiler 12. During the run of the tongue 14, the belt 11 will first slide adhering to the door 17, then on the legs of the user and after it will adhere to the torso and to the waist of the user, taking a position of use identical to that of the seat belts of the prior art.

Then, following the stop of the motor of the vehicle or a voluntary command of the user, the carriage is unblocked and runs among its path back, taking the tongue 14 and the housing 15 in which the tongue is inserted again in the starting position of non use, where a second tongue positioned on the carriage is blocked in a second solenoid brake, assuring the blocking of the carriage and consequently of the housing 15 of the tongue 14, till when another electric pulse operates the solenoid brake so that it takes the pin back and frees the carriage.

According to an alternative embodiment, the housing 15 of the tongue 14 remains blocked in the second position 32 at the base of the back of the seat 16 on the opposed side with respect to that where the coiler 12 and the regulator 13 are, and the carriage carries in its run from the first position 31 to the second position 32 only the tongue 14, which is carried from the position of non use to its final position, where the tongue 14 enters its housing 15. In this case, the return of the tongue 14 to the position of non use must be preceded by an uncoupling of the tongue 14 and the housing 15. The blocking system of the tongue 14 and the housing 15 can be realised by means of an solenoid brake, possibly provided with a fast uncoupling mechanism in case of emergency.

In both the alternative cases, the housing 15 of the tongue 14 is anyway of a traditional kind, in order to allow the immediate uncoupling of the belts in emergency.

The motion of the carriage carrying the tongue 14 and its housing 15 is controlled by suitable devices electrically operated, according to design options that does not change the aims of the present invention.

The advantages of a motorized fastening device for seat belts realized according to the present invention are evident. In fact, without being of any obstacle to the getting of the passenger in the vehicle and his taking place on the seat, the device make sure the seat belt fastening without any trouble, assuring the maximum security on board.

The present invention was described for illustrative but non limitative purposes, according to its preferred embodiments, but it has to be understood that variations and/or modification can be made by the skilled in the art without escaping the relative scope of protection, as defined by the enclosed claims.

The invention claimed is:

1. A motorized fastening device for seat belts of a transportation vehicle, of the kind comprising a belt (11) unwrapping from a coiler (12), which is fixedly arranged on a side of a seat (16), and passing in sequence through a regulator (13), which is fixedly arranged on the same side of said seat (16) where also said coiler (12) is arranged, a tongue (14), a housing (15) of said tongue (14) and a blocking point (18) of the extremity of the belt (11), which is fixedly arranged in proximity of said coiler (12), wherein said device further comprises a track (19) for the sliding of a transport carriage for said tongue (14), obtained on the chassis of said vehicle, defining a path going from a first position (31), corresponding to a position of non-use of the seat belts, positioned on the chassis of the vehicle, on the same side of the seat (16) with respect to said coiler (12) and said regulator (13), behind or at the base of the back of the seat and that, passing under the door (17) and within or under the dashboard of the vehicle, arrives to a second position (32), corresponding to a working position of the seat belts, behind or at the base of the back of the seat (16), on the opposite side of the seat (16) with respect to the position of said coiler (12) and of said regulator (13).

2. The motorized fastening device for seat belts according to claim 1, wherein said tongue (14) is constantly inserted in the corresponding housing (15), transported by said carriage along its path from said first position (31) to said second position (32) of said track (19) and vice versa.

3. The motorized fastening device for seat belts according to claim 1, wherein said housing (15) of said tongue (14) is fixed in a position at the base of the back of the seat (16), on the opposite side of the seat (16) with respect to the position of said coiler (12) and of said regulator (13), and said carriage transports only said tongue (14) in its movement from said first position (31) to said second position (32) of said track (19) and vice versa.

4. The motorized fastening device for seat belts according to claim 1, wherein the displacement of said carriage is operated by electric and/or electro-mechanic moving means.

5. The motorized fastening device for seat belts according to claim 1, wherein the displacement of said carriage is operated by specific manual controls and/or controls connected with the starter of the engine.

6. The motorized fastening device for seat belts according to claim 1, wherein said carriage is linked to at least one transport wire, belt or chain, following said path and moved by a transport mechanism operated by at least one electric and/or electro-mechanic engine.

7. The motorized fastening device for seat belts according to claim 6, wherein said transport mechanism comprises a power pulley and a driven pulley, respectively arranged in a position behind said first position and said second position of said track or vice versa, said power pulley being operated by said electric and/or electro-mechanic engine, said wire forming a closed circuit passing through both said pulleys.

8. The motorized fastening device for seat belts according to claim 6, wherein said transport mechanism comprises two reels, respectively arranged in a position behind said first position and said second position of said track or vice versa, said reels being each operated by an electric and/or electro-mechanic engine, said at least one wire winding alternatively around one of the two reels and unwinding from the other.

9. The motorized fastening device for seat belts according to claim 8, wherein said transport mechanism comprises two wires, one end of each wire being integral with said carriage, the opposed end of each wire being integral with respectively one of the two reels.

10. The motorized fastening device for seat belts according to claim 6, wherein said transport mechanism comprises a reel operated by an electric and/or electro-mechanic engine and a driven pulley, respectively collocated in a position behind said first position and said second position of said track or vice versa, one of the ends of said at least one wire winding around said reel, said at least one wire passing through said driven pulley.

11. The motorized fastening device for seat belts according to claim 2, wherein the displacement of said carriage is operated by electric and/or electro-mechanic moving means.

12. The motorized fastening device for seat belts according to claim 3, wherein the displacement of said carriage is operated by electric and/or electro-mechanic moving means.

13. The motorized fastening device for seat belts according to claim 2, wherein the displacement of said carriage is operated by specific manual controls and/or controls connected with the starter of the engine.

14. The motorized fastening device for seat belts according to claim 3, wherein the displacement of said carriage is operated by specific manual controls and/or controls connected with the starter of the engine.

15. The motorized fastening device for seat belts according to claim 4, wherein the displacement of said carriage is operated by specific manual controls and/or controls connected with the starter of the engine.

16. The motorized fastening device for seat belts according to claim 2, wherein said carriage is linked to at least one transport wire, belt or chain, following said path and moved by a transport mechanism operated by at least one electric and/or electro-mechanic engine.

17. The motorized fastening device for seat belts according to claim 3, wherein said carriage is linked to at least one transport wire, belt or chain, following said path and moved by a transport mechanism operated by at least one electric and/or electro-mechanic engine.

18. The motorized fastening device for seat belts according to claim 4, wherein said carriage is linked to at least one transport wire, belt or chain, following said path and moved by a transport mechanism operated by at least one electric and/or electro-mechanic engine.

19. The motorized fastening device for seat belts according to claim 5, wherein said carriage is linked to at least one transport wire, belt or chain, following said path and moved by a transport mechanism operated by at least one electric and/or electro-mechanic engine.

20. The motorized fastening device for seat belts according to claim 2, wherein said transport mechanism comprises a power pulley and a driven pulley, respectively arranged in a position behind said first position and said second position of said track or vice versa, said power pulley being operated by said electric and/or electro-mechanic engine, said wire forming a closed circuit passing through both said pulleys.

* * * * *